United States Patent
Jiang (10) Patent No.: US 9,922,479 B2
(45) Date of Patent: Mar. 20, 2018

(54) TASK ENABLED SWITCH SYSTEM (71) Applicant: Jianfeng Jiang, Fremont, CA (US)

(72) Inventor: Jianfeng Jiang, Fremont, CA (US)

( * ) Notice: Subject to any disclaimer, the term of this patent is extended or adjusted under 35 U.S.C. 154(b) by 0 days.

(21) Appl. No.: 14/886,199

(22) Filed: Oct. 19, 2015

(65) Prior Publication Data
US 2017/0109951 A1 Apr. 20, 2017

(51) Int. Cl.
G06K 5/00 (2006.01)
G07C 9/00 (2006.01)
G06K 19/06 (2006.01)
G06K 7/14 (2006.01)

(52) U.S. Cl.
CPC ....... G07C 9/00182 (2013.01); G06K 7/1417 (2013.01); G06K 19/06037 (2013.01); G07C 9/00571 (2013.01); G07C 2009/00253 (2013.01); G07C 2009/00769 (2013.01)

(58) Field of Classification Search
CPC ............ G07C 9/00174; G07C 9/00182; G07C 9/00912; G07C 2209/04; G07C 2209/08; G07C 9/00103; G07C 9/00166; G07C 9/0069; E05B 65/46; E05B 47/0012; E05B 47/023; E05B 47/06; E05B 65/462; A47G 29/141; G07F 5/26; Y10T 70/7068
USPC ........................................................ 235/382
See application file for complete search history.

(56) References Cited

U.S. PATENT DOCUMENTS

| | | | | |
|---|---|---|---|---|
| 3,901,057 A | * | 8/1975 | Coley, Sr. ............... | E05B 47/00 70/20 |
| 6,442,983 B1 | * | 9/2002 | Thomas .............. | E05B 47/0012 70/278.1 |
| 8,353,187 B2 | * | 1/2013 | Woodling ........... | E05B 47/0603 70/20 |
| 9,292,986 B1 | * | 3/2016 | Woodward, III .. | G07C 9/00912 |
| 2004/0255623 A1 | * | 12/2004 | Sun ..................... | G07C 9/00563 70/38 A |
| 2006/0179903 A1 | * | 8/2006 | Goldman ............ | E05B 47/0002 70/278.7 |
| 2011/0018682 A1 | * | 1/2011 | Weisfeld ............ | A63B 24/0059 340/5.7 |
| 2012/0011902 A1 | * | 1/2012 | Meekma ............. | E05B 47/0012 70/25 |
| 2013/0119129 A1 | * | 5/2013 | Amdahl ............... | G06Q 20/385 235/381 |
| 2013/0255335 A1 | * | 10/2013 | Jonely ................. | E05B 47/0001 70/277 |
| 2013/0257590 A1 | * | 10/2013 | Kuenzi ..................... | G05B 1/01 340/5.65 |
| 2014/0297487 A1 | * | 10/2014 | Bashkin ............... | G06Q 10/087 705/28 |
| 2014/0318199 A1 | * | 10/2014 | Gokcebay ............... | E05C 3/042 70/278.1 |
| 2014/0375422 A1 | * | 12/2014 | Huber ................ | G07C 9/00174 340/5.61 |

(Continued)

Primary Examiner — Claude J Brown (57) ABSTRACT

A Task Enabled Switch System comprising: A Data Server with a Task Manager Module and a Switch Device Management Module; A Control Device with a Task Player; A Switch Device with a Task Enabled Switch; A user uses the Control Device to download the tasks linked with the Switch Device. Once the tasks are completed successfully, the Control Device will turn on the Task Enabled Switch in the Switch Device. Several lock/latch designs with the said Task Enabled Switch are also presented.

27 Claims, 12 Drawing Sheets

(56) References Cited

U.S. PATENT DOCUMENTS

| | | | |
|---|---|---|---|
| 2015/0186840 A1* | 7/2015 | Torres | A47B 81/00 705/339 |
| 2015/0336010 A1* | 11/2015 | Wiederkehr | A63F 13/85 3/85 |
| 2015/0356801 A1* | 12/2015 | Nitu | G07C 9/00166 340/5.61 |
| 2016/0078699 A1* | 3/2016 | Kalb | G07C 9/00111 340/5.6 |
| 2016/0117874 A1* | 4/2016 | Daniel-Wayman | G07C 9/00111 340/5.61 |
| 2016/0125685 A1* | 5/2016 | Odisho | G07F 17/10 198/678.1 |
| 2016/0132659 A1* | 5/2016 | Vaz | G06F 19/3462 700/242 |

\* cited by examiner

A stand alone padlock with said Task Enabled Switch and a keypad

Fig. 7 Diagram of a pad lock with the said Task Enabled Switch

Diagram of a lock used in a box with the said Task Enabled Switch

Diagram of a latch used in a box with the said Task Enabled Switch

Fig.10 Task Enabled Switch flow chart

Fig. 11 multiple users trying to open the same Switch Box, each user can have different tasks.

Fig. 12

Task Enabled Switch controlled toy, can control the lighting, sound, movement or other functions of the toy by the outcomes of the tasks linked with the toy

TASK ENABLED SWITCH SYSTEM

FIELD OF INVENTION

This invention relates to electronic locks, 2 Dimensional QR Codes, E-learning, toys, gift boxes, vending machines, jewelry boxes, sale boxes, game stations, amusement parks and advertisements.

BACKGROUND OF THE INVENTION

We have lots of different boxes for different purposes, such as gift boxes, jewelry boxes, safe boxes etc. some of the boxes have either electronic or mechanic locks. Some locks are to be opened with physical keys, other locks are to be opened by selecting or entering the correct code for the lock. On the other hand, people, especially kids, get rewarded for doing something good. It would be desirable if the User can be authorized to open a reward box or a gift box after he/she did some assigned tasks correctly. The tasks can be finishing a computer game, or doing a quiz, reading a book, or doing a chore, or some other physical tasks. That is, once a user finished the tasks, the box will be opened automatically, or the user will be given a code to open the box.

On the other hand, there are lots of vending machines, a user can insert coins or paper money or tokens, or swipe credit cards to get access to a vending machine. He/she can then punch the digit pads to select an item (across rows and columns). It would be desirable for the product promotions or advertisements to offer user incentives to do a quiz or game, or other tasks on their mobile devices. After the task is done, an item in the vending machine will he opened automatically. Or a pass code will be given to the user through his mobile device. The user can then enter the pass code on the vending machine, and select an item to open. Or, the pass code may only apply to one designated item, and only that designated item will be opened after entering the pass code.

Furthermore, there are lots of coin operated devices such as mini-carousel, or game stations, it would also be desirable to have the alternative task enabled switch feature. That is, a user can download the designated tasks using a mobile device and open the devices after the tasks are completed.

Finally, the user can use the said Task Enabled Switch to control the lighting, motion, voice or other functions of the connected devices.

The essence of this invention is a Task Enabled Switch, which allows the switch on a Switch Device (such as a box, a lock, a vending machine, a toy etc) to be controlled by a computer or a mobile device after a user successfully finished the designated task. Once the task is completed, the computer or the mobile device can turn on the switch automatically; or the user will be given a temporary pass code, the user can then enter the pass code on the computer, or on the mobile device or on the Switch Device to open the switch.

There can be two kinds of pass codes for the Switch, Device: one kind is the Owner Code for the owner, the other kind is Temporary User Codes for general users. The Temporary User Codes are temporary, and will be in-validated once the code is being used to open the switch. And new Temporary User Codes will be generated to replace the used codes, so that the user need to do some new tasks if he/she wants to open the Switch Device again.

SUMMARY OF THE INVENTION

In accordance with one aspect of the invention, a Task Enabled Switch System consists of: a Data Server that manages the tasks linked with a Switch Device; a Control Device that can download the tasks, play the tasks and control the Switch Device; a Switch Device that contains a Task Enabled Switch. The user can open the Switch Device after finishing the tasks using the Control Device.

In accordance with another aspect of the invention, the Task Enabled Switch has TemporaryUser Codes that are in-validated after being used.

In accordance with another aspect of the invention, the Switch Device may have a 2 Dimensional QR code, a user can scan the OR code and download the designated tasks.

In accordance with another aspect of the invention, the Tasks linked with the Switch Device can be computer games, quizzes, readings, or house chores, sports, or other physical tasks.

In accordance with another aspect of the invention, the judgement of whether the user passed the task can be automatic or manual. If it's automatic, then the tasks are graded automatically by the Control Device or the Data Server right after they are completed. If it's manual, then a physical judge or teacher need to review the task and upload the grades.

In accordance with another aspect of the invention, there is a User ID Recognition Module in the Control Device, the Task Manager in the Data Server can assign different tasks to different users even when all the users are trying to open the same Switch Device at the same time.

In accordance with another aspect of the invention, the Switch Device can have multiple chambers or selections. The pass code given to the user after completing the tasks can be a Long Code which can only open the designated selection, or a Short Code which the user can choose selections after entering the Short Code.

In accordance with another aspect of the invention, a stand alone pad lock can contain a Task Enabled Switch.

In accordance with another aspect of the invention, a latch used in a Switch Box contains a Task Enabled Switch.

In accordance with another aspect of the invention, the Task Enabled Switch can be used to control the lighting, sound, movement or other functions of the Switch Device.

DETAILED DESCRIPTION OF THE INVENTION

The present invention relates to a Task Enabled Switch System. The following description is presented to enable one of ordinary skill in the are to make and use the invention as provided in the context of a particular application and its requirements. Various modifications to the preferred embodiment will be apparent to those with skill in the art and the general principles defined herein may be applied to other embodiments. Therefore, the present invention is not intended to be limited to the particular embodiments shown and described, but is to be accorded the widest scope consistent with the principles and novel features herein disclosed.

Figure 1:
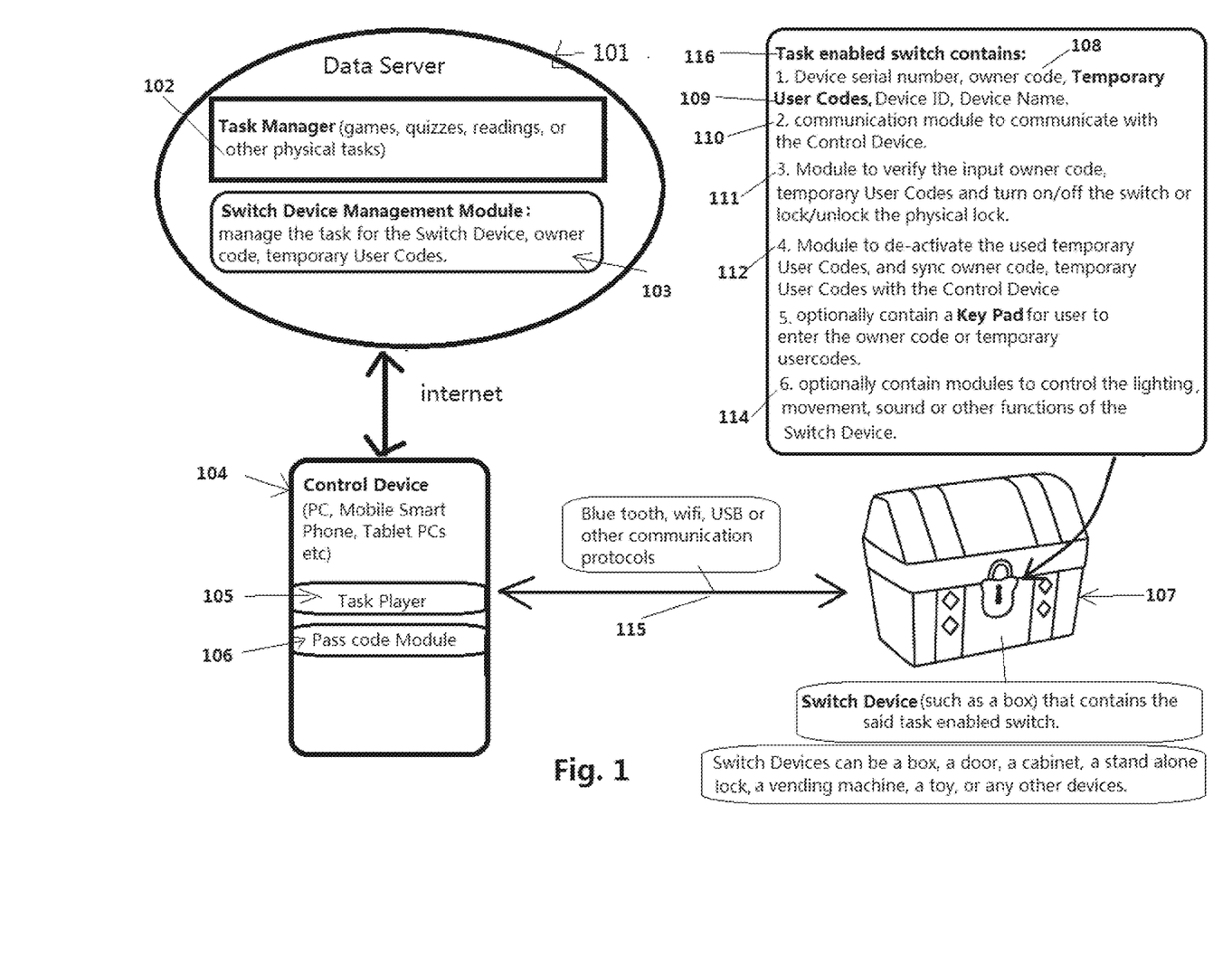
FIG. 1 is a schematic representation of the Task Enabled Switch System. It consists of: a Data Server that manages the tasks linked with a Switch Device; a Control Device that can download the tasks, play the tasks and control the Switch Device; a Switch Device that contains a Task Enabled Switch. The user can open the Switch Device after finishing the tasks using the Control Device.

As shown in FIG. 1, the said Task Enabled Switch System consists of a Data Server 101, a Control Device 104 and a Switch Device 107. There is a Task Manager 102 and Switch Device Management Module 103 in the Data Server 101. The Task Manager 102 manages all the tasks. The tasks can be computer games, quizzes, readings, or house chores, sports, or other physical tasks. The judgement of whether the user passed the task can be automatic or manual. If its automatic, such as a computer game, then the tasks are graded automatically by the Control Device or the Data Server right after they are completed. If it's manual, like a chore or sports activity, then a physical judge or teacher need to review the task and upload the grades.

The Switch Device Management Module 103 manages the tasks for each Switch Device. It also manages the Owner Codes and Temporary User Codes for each Switch Device.

The Task Manager 102 and the Switch Device Management Module 103 can assign different tasks to different users, so that when multiple users try to open the same Control Device at the same time, each user can receive different personalized tasks.

The Control Device 104 can be a PC, a mobile Smart Phone, a Tablet PC etc, it has a Task Player 105 to play the downloaded tasks. It also has a Pass Code Module 106. The Control Device 104 communicates with the Switch Device 107 through Blue Tooth, Wifi, USB or other communication protocols 115.

The Switch Device 117 has a Task Enabled Switch 116, the Task Enabled Switch contains:
1. Device serial number, Owner Code 108, Temporary User Codes 109, Device ID, and Device Name.
2. Communication Module 110 to communicate with the Control Device 104.
3. Module 111 to verify the input Owner Code, Temporary User Codes, and turn on/off the switch or lock/unlock the physical lock.
4. Module 112 to de-activate or in-validate the used Temporary User Codes, and sync the Owner Code 108, Temporary User Codes 109 with the Control Device 104.
5. it may also contain a Key Pad for user to enter the Owner Code 108 or the Temporary User Codes 109.
6. It may also contain modules 114 to control the lighting, movement, sound or other functions of the Switch Device 107.

Figure 2:
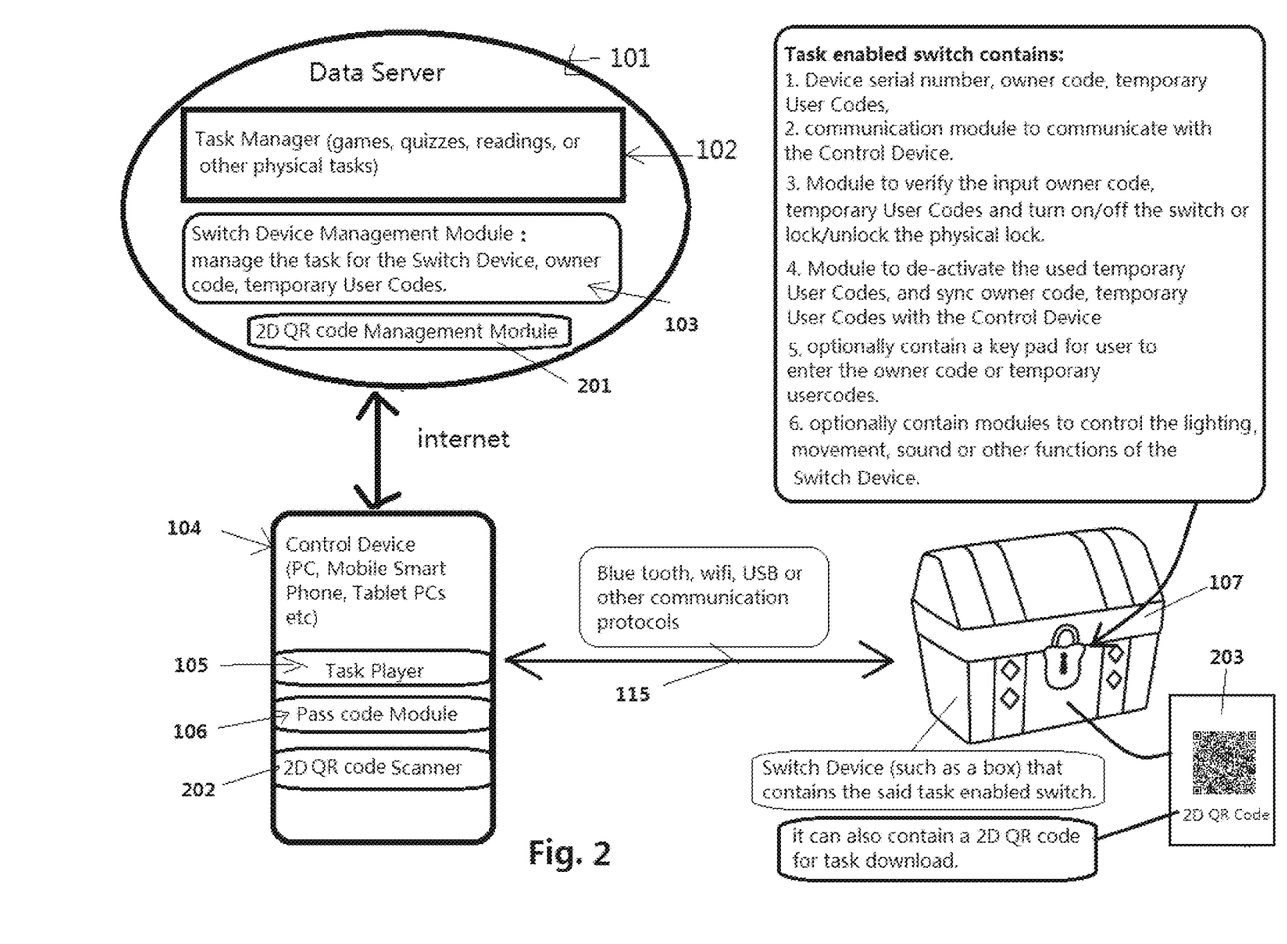
FIG. 2 is another schematic representation of the Task Enabled Switch System. It has 2D QR code Management Module in the Data server; 2D QR code Scanner in the Control Device, and a 2D QR code on the Switch Device.

As shown in FIG. 2. There can be a 2D QR code 203 on the Switch Device 107. The 2D QR code can be both static or dynamic. A static 2D QR code points to a fixed destination web address, while a dynamic 2D QR code can point to a different web address from time to time. A user can scan the 2D QR code 203 using the 2D QR code Scanner 202 to download the tasks. Also there is a 2D QR code management Module 201 in the Data Server 101 to manage all the 2D QR codes 203 and their destination web addresses.

Figure 10:
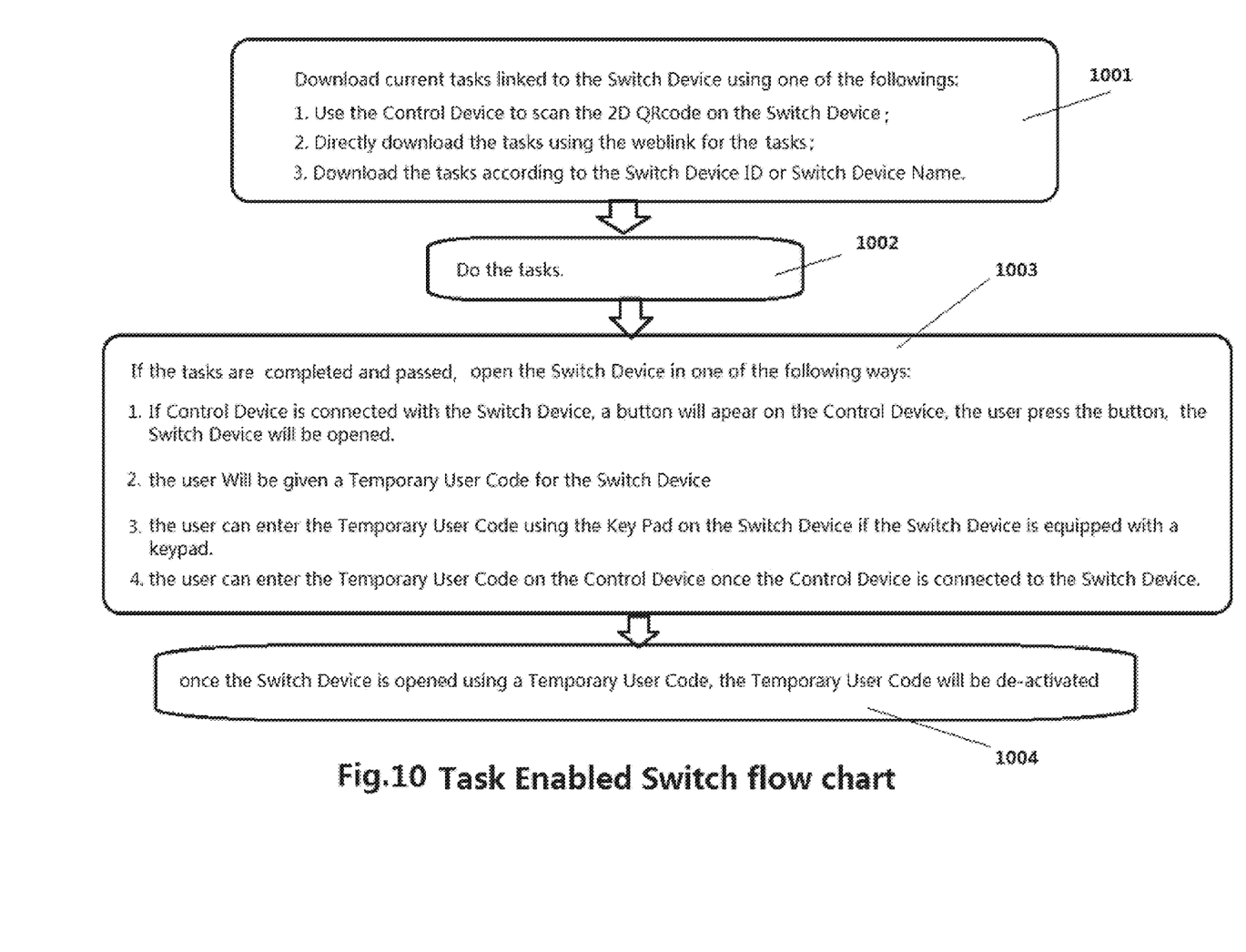
FIG. 10. is the flow chart for the Task Enabled Switch.

As shown in FIG. 10. the Task Enabled Switch System operates as follows:

Step 1001: Download current tasks linked, to the Switch Device 107 using one of the followings:
1. Use the Control Device 104 to scan the 2D Qrcode 203 on Switch Device;
2. Directly download the tasks using the weblink for the content;
3. Download the tasks according to the Switch Device ID or Switch Device Name.

Step 1002: The user do the tasks.

Step 1003: If the tasks are completed and passed. The user can open the Switch Device 107 in one of the following ways:
1. If Control Device 104 is connected with the Switch Device 107, a button will appear on the Control Device 104, the user press the button, the Switch Device 107 will be opened.
2. The user will be given a Temporary User Code 109 for the Switch Device 107, through the Control Device 104, or through E-mail, or other means.
3. The user can enter the Temporary User Code 109 using the Key Pad on the Switch Device 107 if the Switch Device 107 is equipped with a keypad.
4. The user can enter the Temporary User Code 109 on the Control Device 104 once the Control Device 104 is connected to the Switch Device 107.

Figure 3:
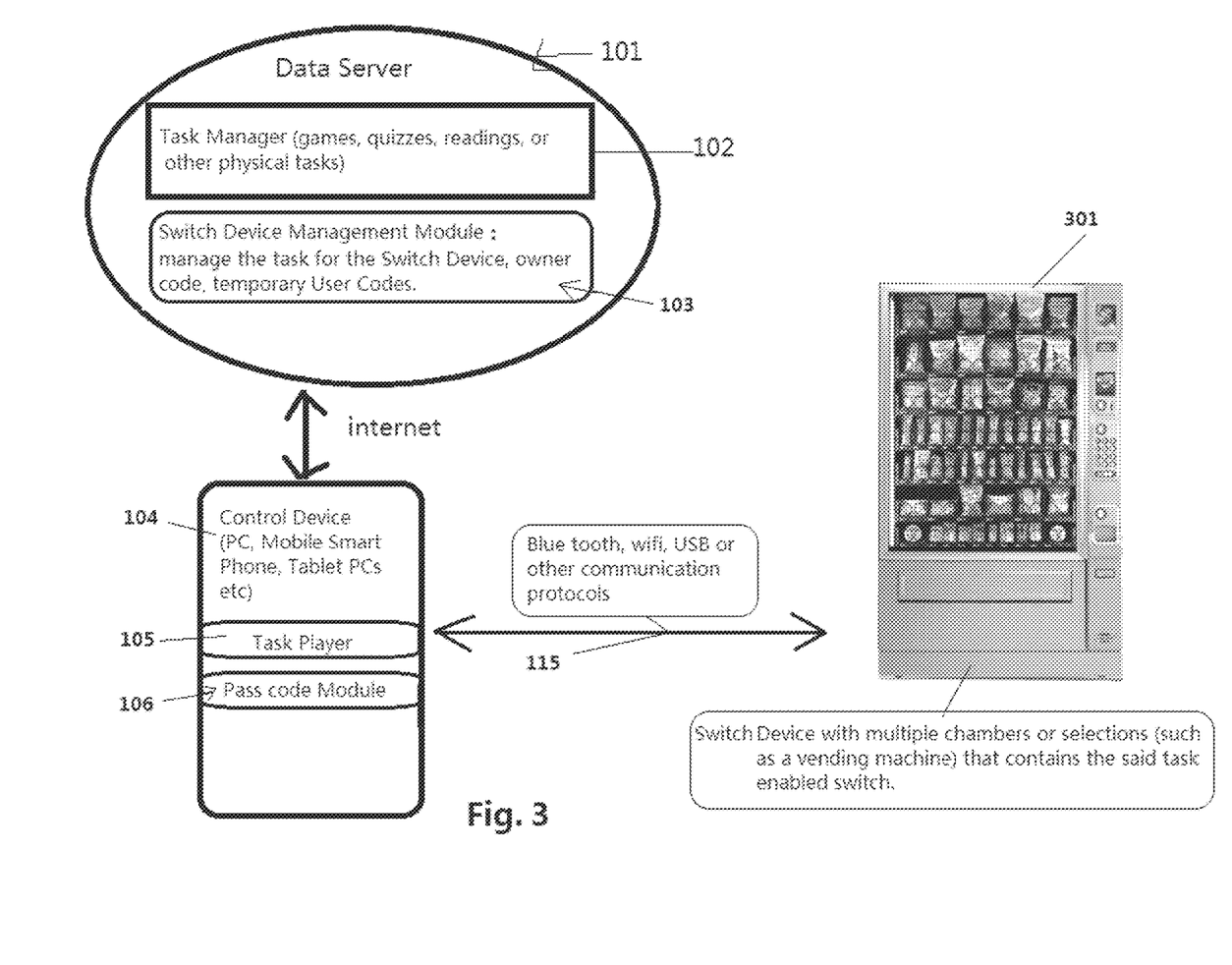
FIG. 3 is a schematic representation of the Task Enabled Switch System, in which the Switch Device has multiple chambers or selections, such as a vending machine.
Figure 4:
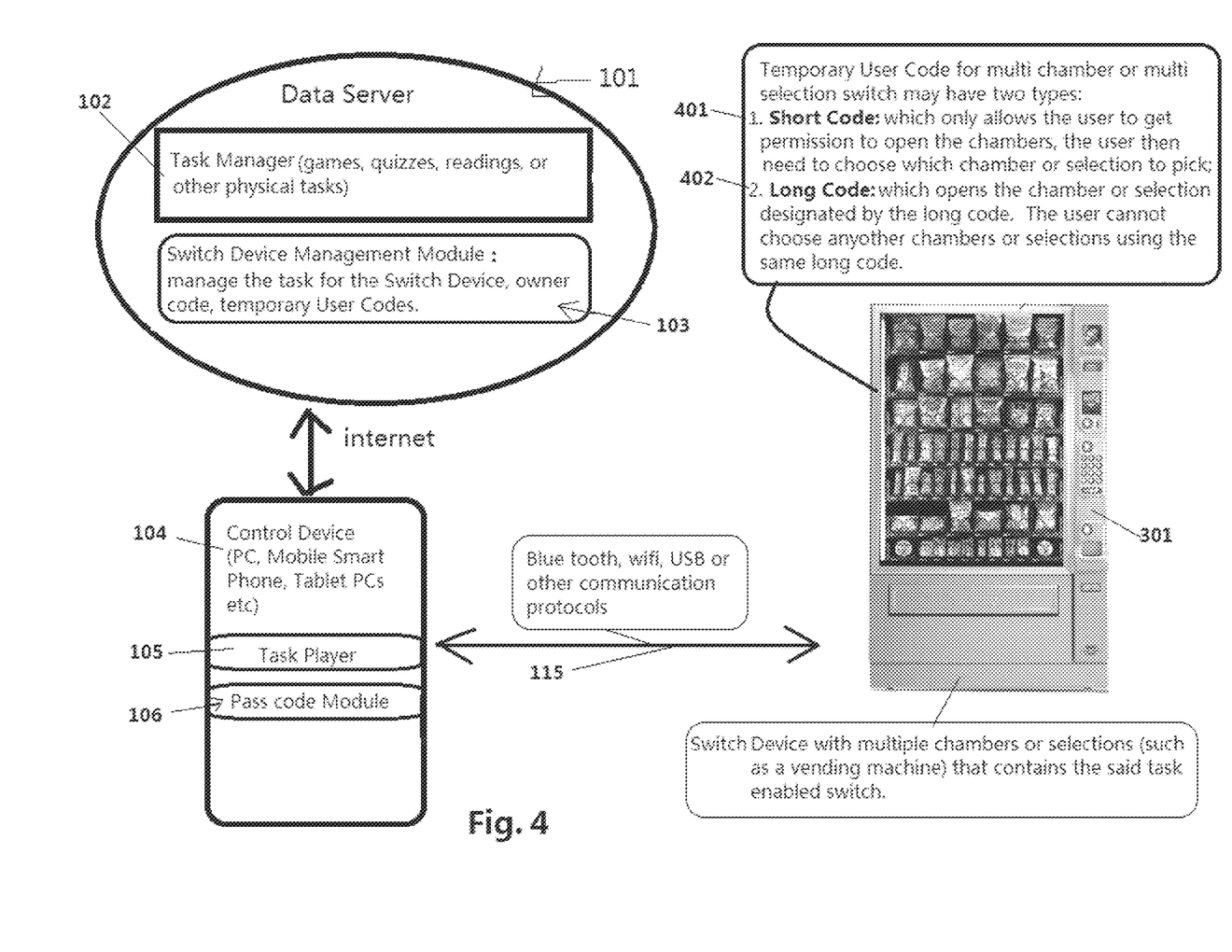
FIG. 4 shows that the Temporary User Codes for the Vending machine can be a Long Code which can only open the designated selection, or a Short Code which the user can choose selections after entering the Short Code.

Step 1004: Once the Switch Device 107 is opened using a Temporary User Code 109, the Temporary User Code 109 will be de-activated As Shown in FIG. 3. The Switch Device 107 can have multiple chambers or selections, such as a vending machine 301. The Temporary User Codes 109 for Switch Devices with multiple chambers or selections can have two types:
1. Short Code 401 which give the user access to the Switch Device, but does not limit which chamber or selection he should pick. The user can select any chamber or selection after entering the Short Code 401.
2. Long Code 402, which opens only the chamber or selection designated by the Long Code 402. The user cannot select any other chamber or selection.

Figure 5:
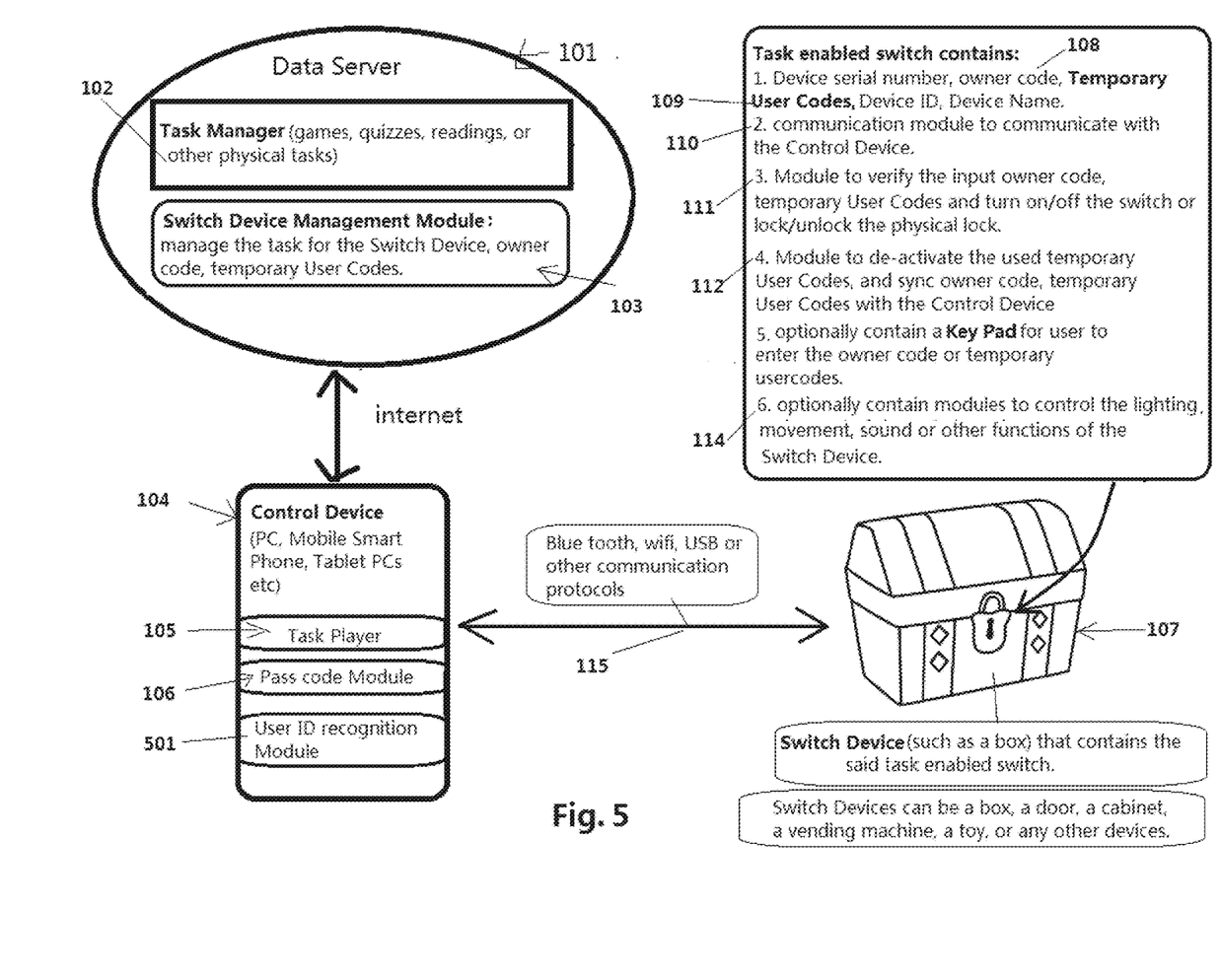
FIG. 5, shows that there can be a User ID recognition Module in the Control Device. The Task Manager in the Data Server can assign different tasks to different users even when all the users are trying to open the same Switch Device at the same time.

As shown in FIG. 5. there is a User ID Recognition Module 501 in the Control Device 104. It is used to identify the user and upload the info to the Data Server 101. The User ID Recognition Module 501 can identify the user by password, by facial or thumb image recognitions, or other ID recognition methods.

Figure 11:
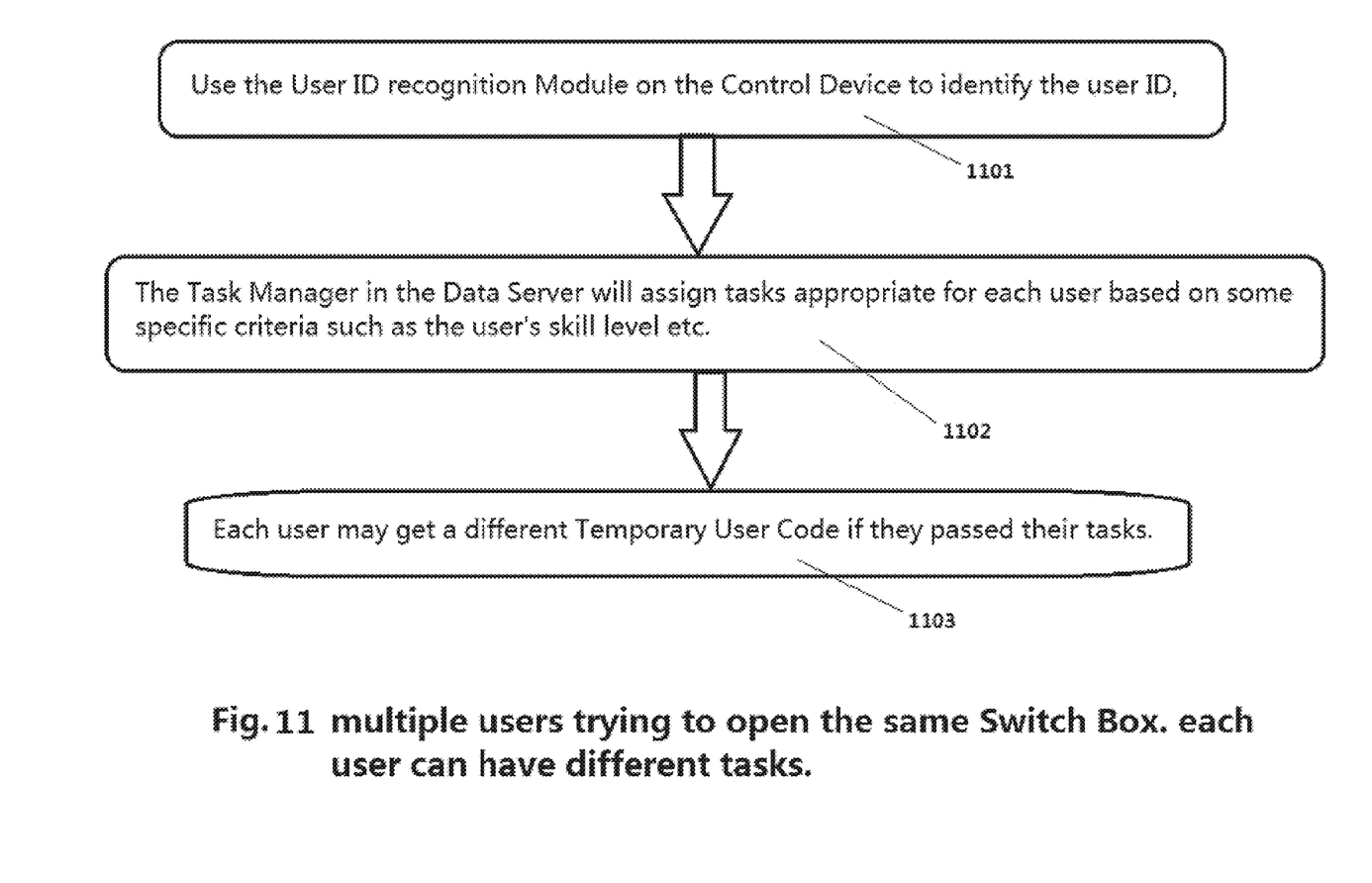
FIG. 11. is the flow chart for multiple users trying to open the same Switch Device at the same time.

As shown in FIG. 11. If there are multiple users trying to open the same Switch Device at the same time. The User ID Recognition Module 501 in the Control Device 104 can identify the user ID and send it to the Data Server 101 (step 1101). The Task Manager 102 and the Switch Device Management Module 103 can assign different tasks to different users according to some specific criteria such as the user's skill level etc (step 1102). After the users finished their tasks, each user may get a different Temporary User Code if they passed their tasks (step 1103).

Figure 6:
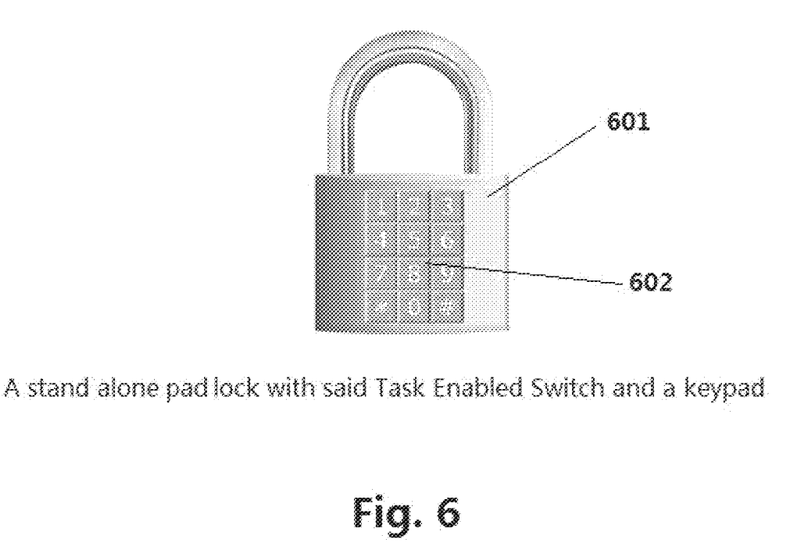
FIG. 6. Shows a pad lock designed with the said Task Enabled Switch and a keypad to enter the pass codes.

FIG. 6 shows a pad lock 601 that contains the said Task Enabled Switch 116. It also has a key pad 602, which is optional.

Figure 7:
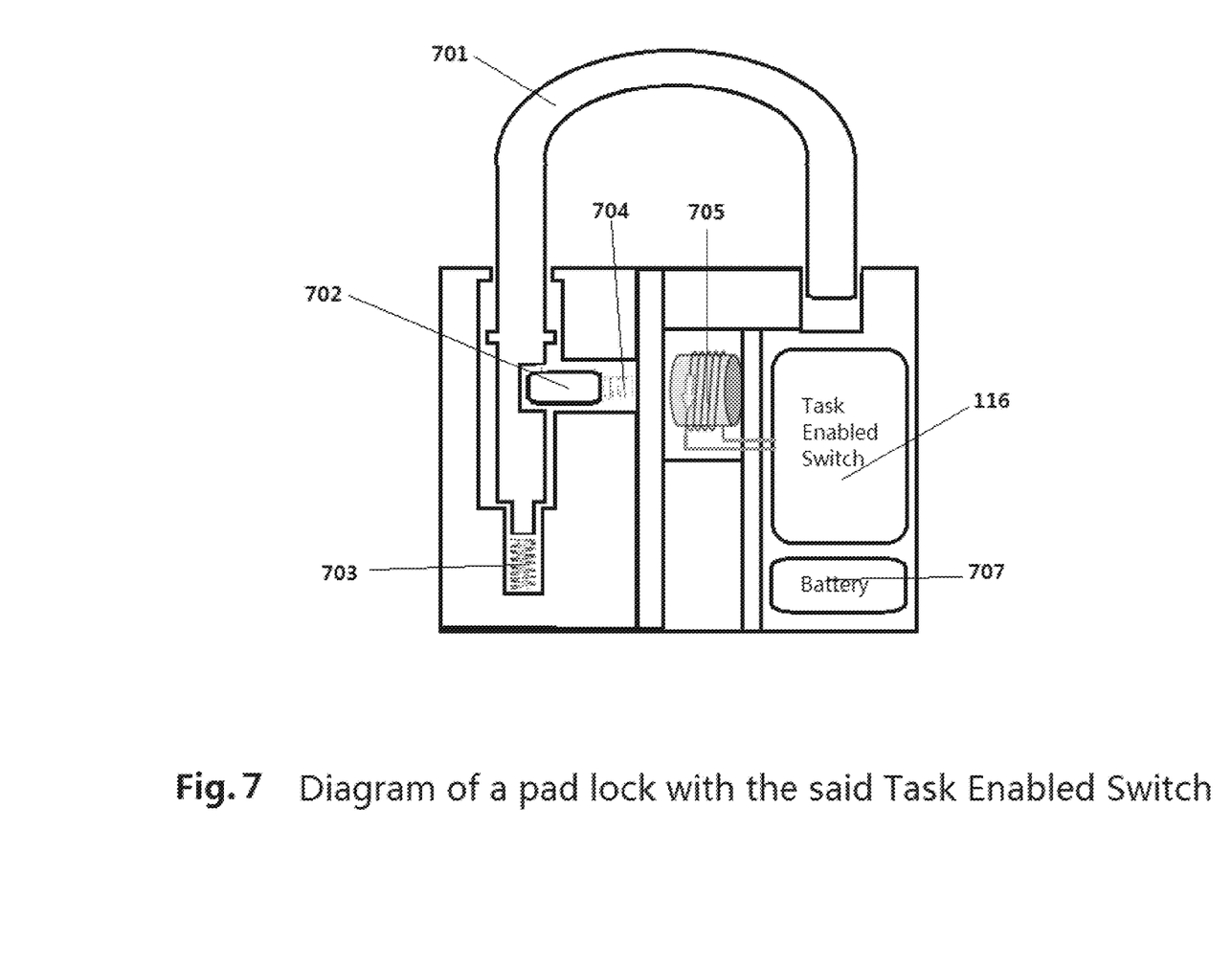
FIG. 7 shows one design of a pad lock with the said Task Enabled Switch.

FIG. 7 shows the diagram of one design of the pad lock 601. It consists of a dented metal bar 701, a metal bolt 702, two spring coils 703 and 704, a solenoid electric magnet 705, the Task Enabled Switch 116 and Battery 707. During the lock state, the bolt 702 locked the metal bar 701. To open the lock, the Task Enabled Switch 116 is turn on by the Control Device 104, which will activate the solenoid magnet 705. The solenoid magnet 705 will pull out the metal bolt 702, the metal bar 701 will then be ejected out by the spring coil 703. To lock the lock again, turn off the Task Enabled Switch, and push down the metal bar 701, the metal bolt 702 will again lock the metal bar 701 by the spring coil 704.

Figure 8:
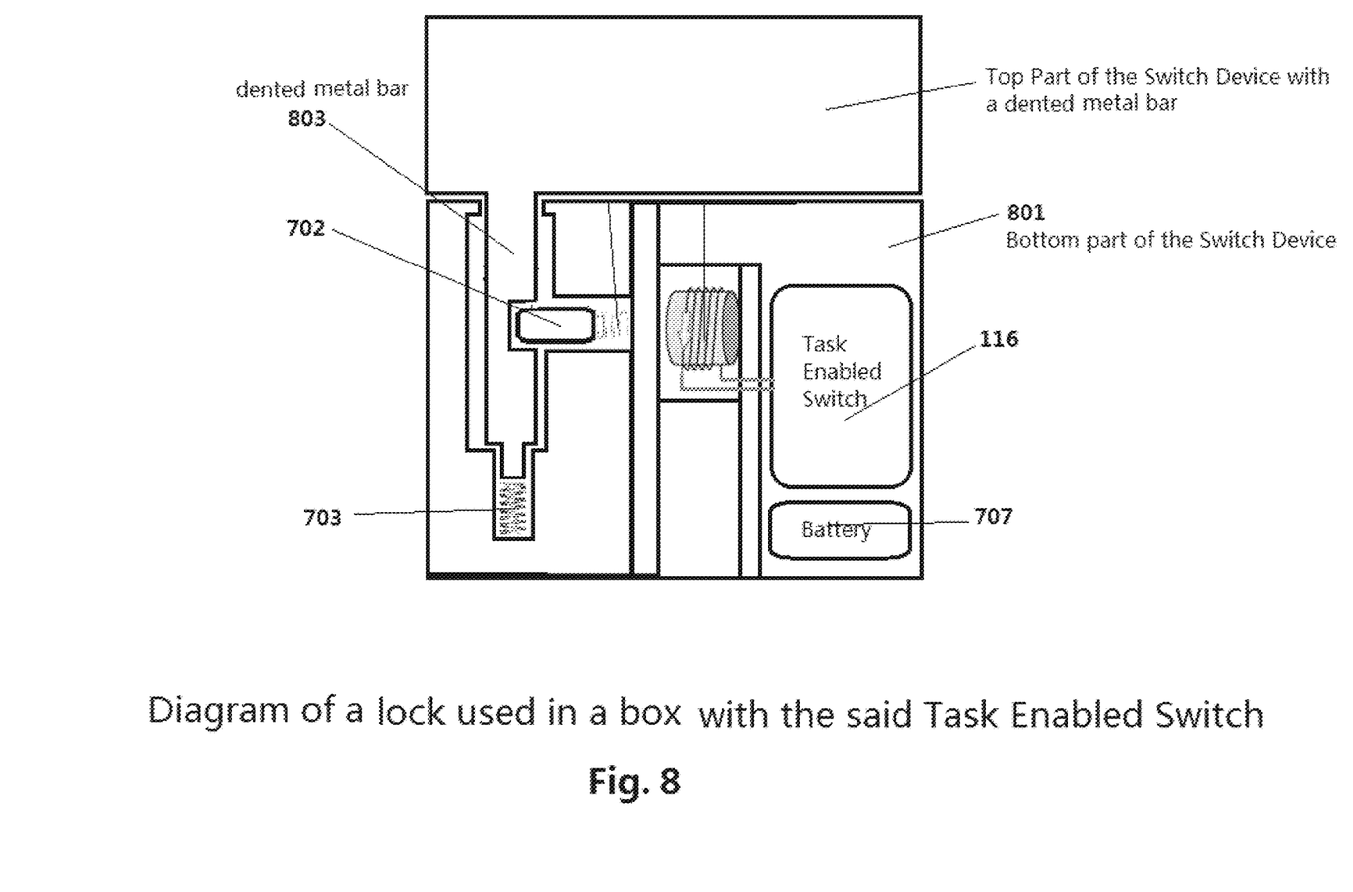
FIG. 8 shows one design of a lock with the said Task Enabled Switch.

FIG. 8 shows the diagram of lock used in a box with the said Task Enabled Switch. It is similar to the pad lock design of FIG. 7, except that the dented metal bar 803 is attached to the Top part of the box, and the rest of the lock is attached to the Bottom part of the box 801.

Figure 9:
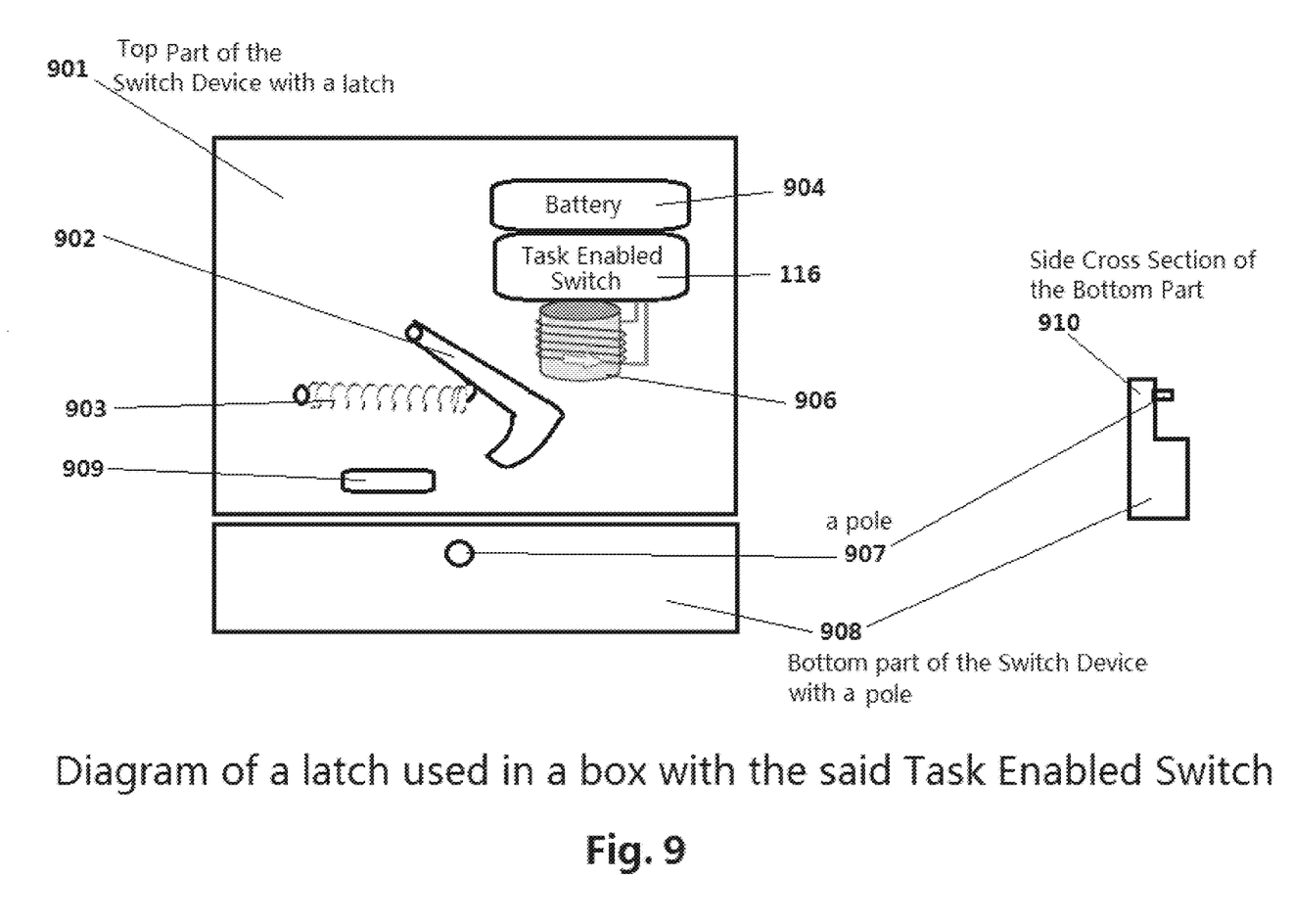
FIG. 9 shows one design of a latch with the said Task Enabled Switch.

FIG. 9 shows the diagram of one design of a latch with the said Task Enabled Switch. It may he used to lock a box. It consists or a Top part 901 and a Bottom part 908. The top part consists of a curved metal bar 902 which can rotate around one end; a spring coil 903 to pull the metal bar 902 into lock position; a Stop 909 to stop the metal bar 902 from swinging past lock position; The Task Enabled Switch 116; A solenoid electric magnet 906 and Battery 904.

On the bottom part 908, there is a pole 907 used to lock the latch. The Side Cross Section of the Bottom Part is also shown in 910.

To Lock the latch, turn off the solenoid magnet, the metal bar 902 will be pulled to the lock position. Then push the pole 907 past the lock position of metal bar 902, the pole 907 will be locked inside the metal bar 902.

To open the latch, the Control Device 104 will turn on the Task Enabled Switch 116, which will turn on the solenoid magnet 906, will will then pull away the metal bar 902. The pole 907 can then be pulled out of the lock position.

It should be noted that the metal bar 902 can be pull open either by the solenoid magnet of 906, or by a small motor controlled b the Task Enabled Switch 116. the small motor can rotate the metal bar 902 to open or close the latch.

Figure 12:
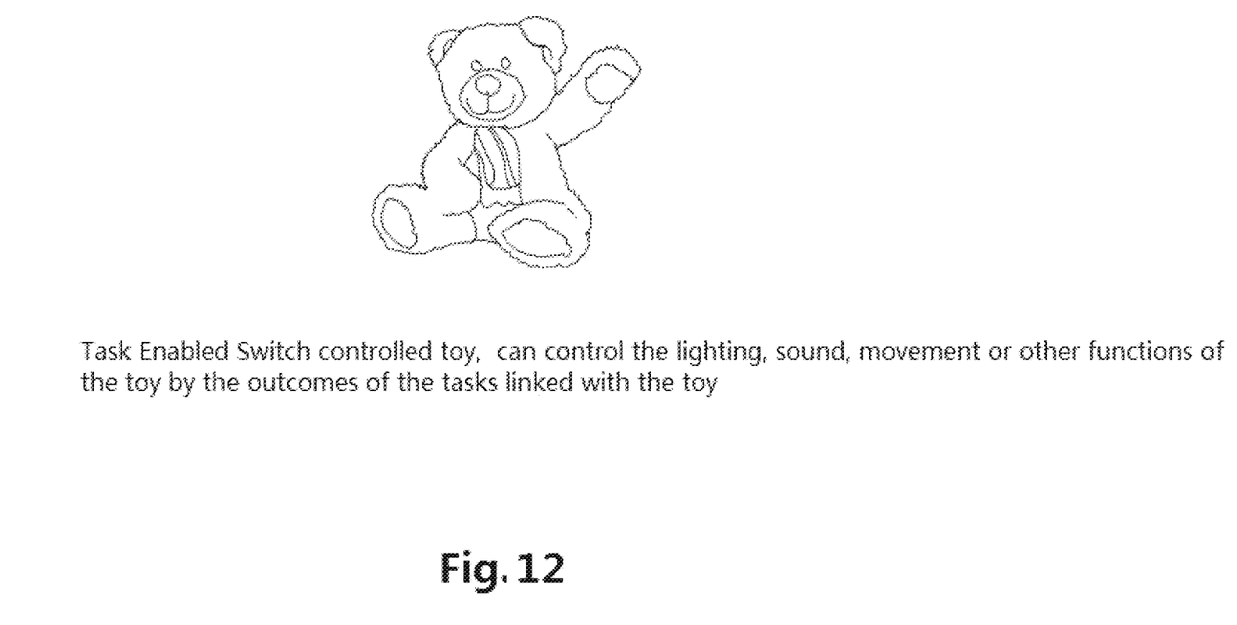
FIG. 12. shows that the Task Enabled Switch can be used to control the lighting, sound, movement or other functions of the Switch Device.

FIG. 12 shows that the said Task Enabled Switch 116 can be used to control the lighting, sound, movement, or other functions of the Switch Device.

The following claims are therefore made:

1. A computer-implemented method comprising:
   receiving, by a client device, an identifier associated with a locked device;
   based on the identifier, transmitting, by the client device to one or more server devices, a request to unlock the locked device;
   transmitting, from the client device to the one or more server devices, a user identifier associated with a user of the client device;
   receiving at the client device, in response to the request to unlock the locking mechanism, two or more tasks associated with the locked device, wherein the two or more tasks are selected from a plurality of tasks based on the user identifier, comprising automatically graded tasks and/or manually graded tasks;
   automatically determining at the client device and/or at the one or more server devices that all or a required percentage of the automatically graded tasks have been completed and passed, wherein said automatically graded tasks comprise electronic games, electronic quizzes, and electronic books;
   manually determining at the client device that all or a required percentage of the manually graded tasks have been completed and passed, wherein said manually graded tasks comprise instructions to complete one or more tasks to be judged by one or more designated human judges,
   notifying the one or more server devices from the client device that said one or more designated human judges have determined that all or a required percentage of the manually graded tasks received by the client device have been completed and passed,
   notifying the one or more server devices from the client device that all or a required percentage of the automatically graded tasks have been completed and passed, and
   unlocking the locked device based on the notification.

2. The method of claim 1, wherein the identifier is received from the scanning of a two-dimensional barcode by the client device.

3. The method of claim 1, wherein the locked device comprises a physical container locked with a locking mechanism.

4. The method of claim 3, wherein the locking mechanism comprises an electric motor or an electric magnet.

5. The method of claim 1, wherein the locked device comprises an electronic device, and wherein unlocking the locked device comprises providing access to one or more functionalities of the electronic device.

6. The method of claim 5, wherein the one or more functionalities comprises a lighting, sound or movement of the electronic device.

7. The method of claim 1, wherein the step of unlocking the device comprises one of the client device or the one or more server devices sending a signal directly to the locked device to unlock the locked device.

8. The method of claim 7, wherein the signal is transmitted through a wired connection.

9. The method of claim 7, wherein the signal is transmitted through a wireless connection.

10. The method of claim 1, wherein the step of unlocking the device comprises:
    the client device receiving an authorization code from the one or more server devices,
    the user entering the authorization code to an interface of the client device, and
    the client device transmitting the authorization code to an interface of the locked device.

11. The method of claim 10, wherein the authorization code is a temporary code.

12. The method of claim 10, wherein authorization code unlocks one or more physical locking mechanisms of a plurality of locking mechanisms coupled to a physical container, each locking mechanism providing access to a portion of the container.

13. The method of claim 1, wherein the step of unlocking the device comprises:
    the client device receiving an authorization code from the one or more server devices, the user entering the authorization code to an interface of the locked device.

14. The method of claim 13, wherein the authorization code is a temporary code.

15. The method of claim 13, wherein authorization code unlocks one or more physical locking mechanisms of a plurality of locking mechanisms coupled to a physical container, each locking mechanism providing access to a portion of the container.

16. A system comprising:
a memory;
at least one processor coupled to the memory and configured to:
receive, by a client device, an identifier associated with a locked device;
based on the identifier, transmit, by the client device to one or more server devices, a request to unlock the locked device;
transmit, from the client device to the one or more server devices, a user identifier associated with a user of the client device;
receive at the client device, in response to the request to unlock the locking mechanism, two or more tasks associated with the locked device, wherein the two or more tasks are selected from a plurality of tasks based on the user identifier, comprising automatically graded tasks and/or manually graded tasks;
automatically determine at the client device and/or at the one or more server devices that all or a required percentage of the automatically graded tasks have been completed and passed, wherein said automatically graded tasks comprise electronic games, electronic quizzes, and electronic books;
manually determine at the client device that all or a required percentage of the manually graded tasks have been completed and passed, wherein said manually graded tasks comprise instructions to complete one or more tasks to be judged by one or more designated human judges,
notify the one or more server devices from the client device that said one or more designated human judges have determined that all or a required percentage of the manually graded tasks received by the client device have been completed and passed,
notify the one or more server devices from the client device that all or a required percentage of the automatically graded tasks have been completed and passed, and
unlock the locked device based on the notification.

17. The system of claim 16, wherein the identifier is received from the scanning of a two-dimensional barcode by the client device.

18. The system of claim 16, wherein the step of unlocking the device comprises one of the client device or the one or more server devices sending a signal directly to the locked device to unlock the locked device.

19. The system of claim 18, wherein the signal is transmitted through a wired connection.

20. The system of claim 18, wherein the signal is transmitted through a wireless connection.

21. The system of claim 16, wherein the step of unlocking the device comprises:
the client device receiving an authorization code from the one or more server devices,
the user entering the authorization code to an interface of the client device, and
the client device transmitting the authorization code to an interface of the locked device.

22. The system of claim 21, wherein the authorization code is a temporary code.

23. The system of claim 21, wherein the authorization code unlocks one or more physical locking mechanisms of a plurality of locking mechanisms coupled to a physical container, each locking mechanism providing access to a portion of the container.

24. The system of claim 16, wherein the step of unlocking the device comprises:
the client device receiving an authorization code from the one or more server devices,
the user entering the authorization code to an interface of the locked device.

25. The system of claim 24, wherein the authorization code is a temporary code.

26. The system of claim 24, wherein the authorization code unlocks one or more physical locking mechanisms of a plurality of locking mechanisms coupled to a physical container, each locking mechanism providing access to a portion of the container.

27. A non-transitory computer-readable medium having instructions stored thereon that, when executed by at least one computing device, causes the at least one computing device to perform operations comprising:
receiving, by a client device, an identifier associated with a locked device;
based on the identifier, transmitting, by the client device to one or more server devices, a request to unlock the locked device;
transmitting, from the client device to the one or more server devices, a user identifier associated with a user of the client device;
receiving at the client device, in response to the request to unlock the locking mechanism, two or more tasks associated with the locked device, wherein the two or more tasks are selected from a plurality of tasks based on the user identifier, comprising automatically graded tasks and/or manually graded tasks;
automatically determining at the client device that all or a required percentage of the automatically graded tasks have been completed and passed, wherein said automatically graded tasks comprise electronic learning games, electronic quizzes, and electronic books;
manually determining at the client device that all or a required percentage of the manually graded tasks have been completed and passed, wherein said manually graded tasks comprise instructions to complete one or more tasks to be judged by one or more designated human judges,
notifying the one or more server devices from the client device that said one or more designated human judges have determined that all or a required percentage of the manually graded tasks received by the client device have been completed and passed,
notifying the one or more server devices from the client device that all or a required percentage of the automatically graded tasks have been completed and passed, and
unlocking the locked device based on the notification.

* * * * *